United States Patent [19]

Lazcano-Navarro

[11] Patent Number: 4,762,554
[45] Date of Patent: Aug. 9, 1988

[54] PROCESS TO ELIMINATE HAZARDOUS COMPONENTS FROM THE ELECTRIC ARC FURNACE FLUE DUST AND RECOVERING OF METALS

[76] Inventor: Arturo Lazcano-Navarro, Saltillo, Coahuila, Mexico

[21] Appl. No.: 928,925

[22] Filed: Nov. 10, 1986

[51] Int. Cl.$^4$ .............................................. C21B 3/04
[52] U.S. Cl. ...................................... 75/10.14; 75/25
[58] Field of Search ............................... 75/10.14, 25

[56] References Cited

U.S. PATENT DOCUMENTS

| | | | |
|---|---|---|---|
| 3,770,416 | 11/1973 | Goksel | 75/25 |
| 3,945,817 | 3/1976 | Yatsunami | 75/25 |
| 4,612,041 | 9/1986 | Matsuoka | 75/25 |

Primary Examiner—Peter D. Rosenberg
Attorney, Agent, or Firm—Laurence R. Brown; Alfred J. Mangels

[57] ABSTRACT

A method and apparatus for the pyrometallurgical treatment of the environmentally hazardous steel mill flue dust or similar materials recovering the volatile metals from such materials in reduced form and converting the remaining iron into steel and slag. The distilled heavy metals are recovered as alloy by gas-expansion condensing from the top gas.

The process reduction is carried out utilizing natural gas as reductant which is bottom injected in an induction furnace in which a furnace burden is formed of green ball pellets or formed as flue dust powders and an electromagnetic induction susceptor to heat the charge.

12 Claims, 2 Drawing Sheets

PROCESS TO ELIMINATE HAZARDOUS COMPONENTS FROM THE ELECTRIC ARC FURNACE FLUE DUST AND RECOVERING OF METALS

BACKGROUND OF THE INVENTION

The dust generated in the electric arc furnace (herein after EAF) is extremely fine and is formed by metal vaporization, subsequent reaction with the oxygen within the furnace, and deposition on condensed nuclei. Such a dust formation process is a result of the high temperatures generated in the arc zone, the oxygen jet-melt interactions, melt boiling during refining and because tramp metals, such as zinc, lead and cadmium, are highly volatile at the temperatures of the molten steel. This EAF dust is a hazardous waste due to the leachability of the toxic tramp elements of lead, cadmium and chromium.

Due to the undesirable elements of sodium, potassium, zinc and lead, recycle of flue dust in the steel plant is not prudent. In addition, the dust is extemely fine and difficult to handle and transport.

The dust is presently being disposed of in landfills onsite or at a licensed outside facility.

The dust with 15-25% Zn is presently being disposed of in landfills on-site or at a licensed outside facility, the dust of high zinc content, >25% is sufficiently rich in zinc to be processed by zinc refiners or by fertilizer manufacturers.

Besides the zinc recovery, the trend is to develop processes or practices for recovery of the iron and slag from low-level zinc dust in order to get a more economic process.

Two of the processes offering the best prospects for success are the plasma driven direct reduction process and a process involving solvent extraction chemistry to produce a high quality zinc metal powder.

However, both plasma and solvent extraction processes require too much capital and operating cost, and are too technically sophisticated.

OBJECTS OF THE INVENTION

It is a principal object of this invention to provide a method to terminate the existence of the material as a hazardous waste in a simpler and more economic way than recent processes proposed for the same.

It is another object of the present invention to provide a method to recover the heavy metals (Zn, Pb, Cd) from EAF flue dust in a metallic form and convert the remaining iron into steel and slag using natural gas as a reductant.

It is another object of this invention to provide a method to carry out the reduction process without solid carbon in the charge, wherein said charge can be made of EAF flue dust pellets, EAF flue dust as powder, or secondary flue dust from another process for treating EAF flue dust as powder or in pelletized form, or similar materials.

Is is another object of this invention to provide a method and apparatus that can be operated "on-site" at mini-steel mills for the purpose of recycling hazardous EAF flue dust into reclaimable, non-hazardous by-products, such as liquid steel and slag, and Zn-Pb-Cd alloy.

SUMMARY OF THE INVENTION

The present invention is directed to a pyrometallurgical treatment of the EAF flue dust or similar materials as powders or pellets, without solid carbon in the charge, utilizing natural gas as sole reductant. The overall reactions in the furnace are endothermic, the heat required being supplied by electromagnetic induction, using a conventional electric induction furnace provided with an induction susceptor in the charge.

Natural gas is bottom injected through a ceramic, gas permeable device, and at the same time that it acts as a reductant, natural gas acts as a gas carrier of the metallic vapours formed during the reduction process. The vapours are a zinc-lead vaporized alloy which is formed during the zinc reduction, by reacting zinc vapour with previously reduced lead that has not coalesced and remains still as micro-droplets. Such an alloy, also containing cadmium and having a boiling point, close to the zinc boiling point is condensed at the top gas exit wherein a reducing atmosphere is maintained. Top gases, after passing the condenser, are burned by permitting air entrance in the duct after the burner, and are scrubbed and cleaned before being sent to the stack. The secondary flue dust is recycled to the charge and the remaining steel in the furnace can be poured or refined to produce any conventional induction furnace alloy.

BRIEF DESCRIPTION OF THE DRAWINGS

The present invention will be more readily understood by referring to the following detailed specification and the appended drawings in which.

DESCRIPTION OF THE INVENTION

Figure 1:
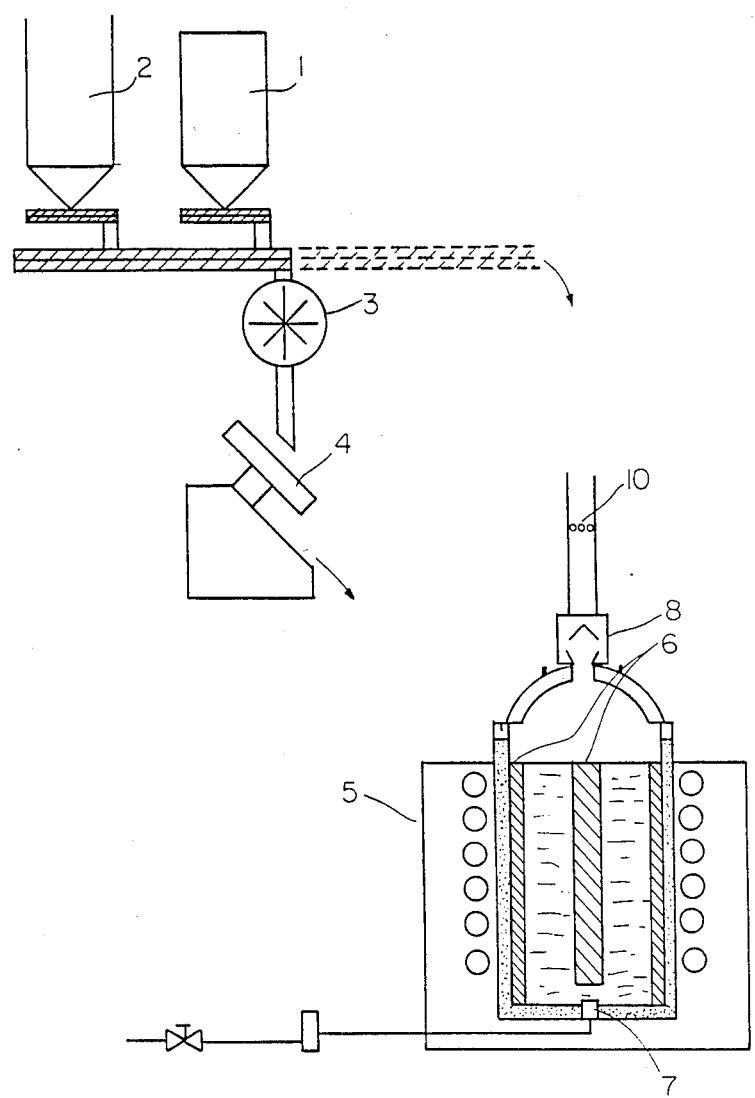
FIG. 1 is a process flow diagram illustrating the relationships of the various pieces of apparatus employed in this invention.

Referring now to drawing FIG. 1, EAF flue dust 1 and binders 2 will be conveyed to the mixer 3 taking metered a mounts from the respective bins. The green ball pelletizing process is carried out in the disc 4 and after drying, the green ball pellets are charged to the electric induction furnace 5. When the charge is completed, the furnace is closed and a gas tight seal is made in order to avoid air entrance. The charge can also be introduced by direct feeding of flue dust powder. The feed material is accommodated inside the furnace between the induction susceptors 6. The induction susceptors can be made of a different geometry and nature, depending on the furnace size and on the desired heating pattern. The susceptors respond to the elecromagnetic field and heat the charge. Natural gas is bottom injected through the ceramic, gas permeable device 7. Suitable thermocouples (not shown) are inserted into the burden at selected elevations.

From the beginning of the operation, natural gas is bottom injected in order to avoid agglomeration of the charge. The top gases are passed through a special type of condenser 8 wherein most of the metallic vapours are condensed. The exit gases containing CO, $H_2$, $CO_2$ and $H_2O$ are burned by permitting air entrance through the orifices 10, and are conveyed to a scrubber (not shown).

Figure 2:
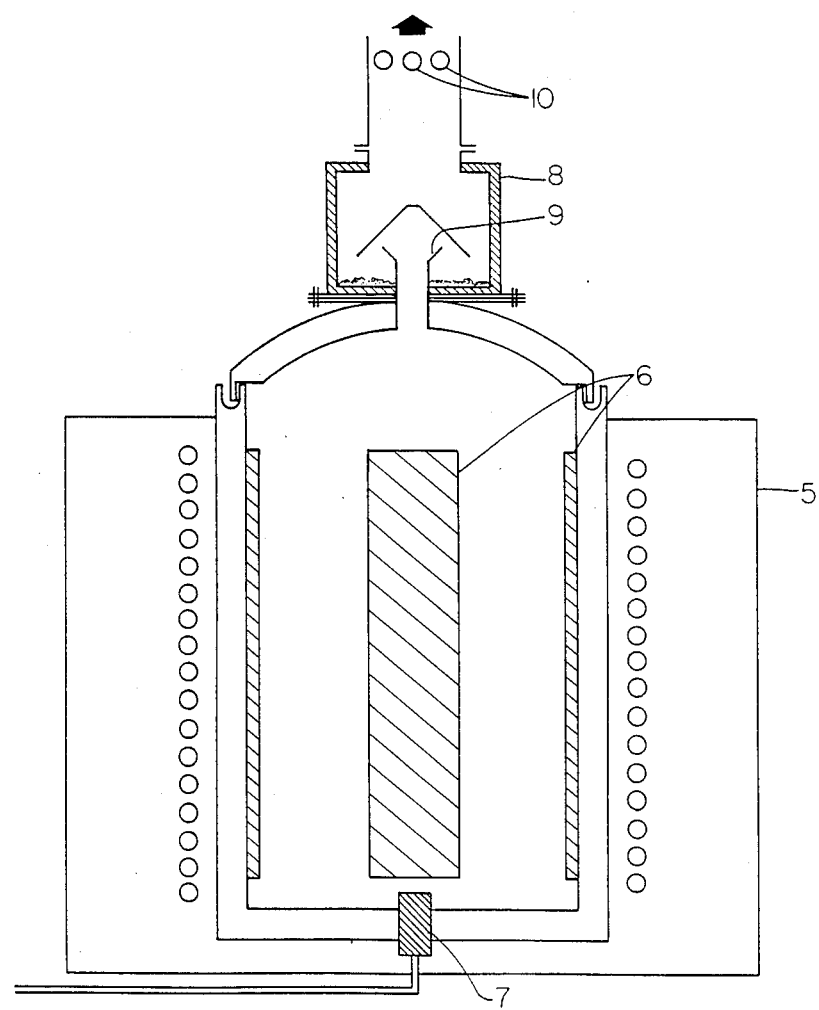
FIG. 2 is an elevational cross setion of the preferred embodiment of the present invention.

FIG. 2 shows the special type of condenser 8, which can be a rectangular condenser, wherein the metallic vapours are condensed by the expansion cooling effect of the diffuser 9, and the liquid alloy is collected in the bottom of said condenser.

When the reduction process is over, that is indicated by the charge temperature, which rises to over 1200° C., and the remaining iron is melted, being a steel of 0.4%C., according to the inventor's experience in 650 Kg furnace trials. That liquid metal can be poured as a by-product or can be the starting material to produce any conventional induction furnace alloy.

What is claimed as new and desired to be protected by Letters Patent is set forth in the appended claims:

1. A method to recover metals from flue dust generated in an electric arc furnace, said method comprising: charging pelletized or powder flue dust into an electric induction furnace between induction susceptors; sealing of the furnace top to prevent entry of air; injecting natural gas through the bottom of the electric induction furnace as a solitary reducing agent; heating the charge by electromagnetic induction of the susceptors to provide reduction energy; recovering of heavy metals as a zinclead-cadmium alloy in a condenser at the top of the furnace; burning and scrubbing exiting gases in the condenser; and melting the remaining iron to produce steel and slag.

2. A method according to claim 1, including the step of recycling secondary flue dust from the process as a part of the charge.

3. A method according to claim 1 wherein said charge includes at least one of zinc, lead, cadmium, and iron.

4. A method according to claim 1, wherein the steel produced is refined in the same induction furnace to produce a conventional induction furnace alloy.

5. A method according to claim 1 wherein said induction susceptors are steel ingots.

6. A method according to claim 1 wherein said induction susceptors are concentric steel pipes.

7. A method according to claim 1 wherein said induction susceptors are selected from the group consisting of steel wool and shavings.

8. A method according to claim 1 wherein said susceptors are steel bars.

9. A method according to claim 1 wherein said susceptor is a gaphite bar.

10. A method according to claim 1 wherein said susceptors are graphite pipes.

11. A method according to claim 1 wherein said susceptors are selected from the group consisting of steel ingots, concentric steel pipes, steel wool, steel shavings, and steel bars.

12. A method according to claim 1 wherein said condenser is rectangular in shape, and wherein condensation occurs by the expansion effect of the gases, which expansion effect is produced in a diffuser formed at the furnace top and at the condenser entrance, for cooling the gas stream and condensing the metallic vapours.

* * * * *